United States Patent [19]

White, Jr.

[11] Patent Number: 5,273,496
[45] Date of Patent: Dec. 28, 1993

[54] BELT CONSTRUCTION, THE COMBINATION OF THE BELT CONSTRUCTION AND A PULEY AND METHODS OF MAKING THE SAME

[75] Inventor: Jack D. White, Jr., Springfield, Mo.
[73] Assignee: Dayco Products, Inc., Dayton, Ohio
[21] Appl. No.: 717,223
[22] Filed: Jun. 18, 1991
[51] Int. Cl.⁵ .............................................. F16G 5/00
[52] U.S. Cl. .................................... 474/238; 474/205
[58] Field of Search ............... 474/238, 267, 251, 205, 474/263, 266, 237, 249, 265, 252

[56] References Cited

U.S. PATENT DOCUMENTS

| | | | |
|---|---|---|---|
| 2,728,239 | 12/1955 | Adams Jr. | 474/238 X |
| 3,839,116 | 10/1974 | Thomas et al. | 474/263 X |
| 3,948,113 | 4/1976 | Stork | 474/238 X |
| 4,266,937 | 5/1981 | Takano | 474/267 X |
| 4,276,039 | 6/1981 | Takano | 474/267 X |
| 4,559,029 | 12/1985 | Miranti, Jr. et al. | 474/251 |
| 4,596,538 | 6/1986 | Henderson | 474/135 |
| 4,647,278 | 3/1987 | Hull | 474/205 |
| 4,773,895 | 9/1988 | Takami et al. | 474/238 |
| 4,892,510 | 1/1990 | Matsuoka et al. | 474/263 X |
| 4,938,736 | 7/1990 | Miranti, Jr. | 474/205 |
| 4,981,462 | 1/1991 | White, Jr. et al. | 474/238 |
| 5,030,174 | 7/1991 | Eguchi | 474/205 |

FOREIGN PATENT DOCUMENTS 1071725  3/1954  France ........................... 474/238

Primary Examiner—Rodney M. Lindsey
Attorney, Agent, or Firm—Joseph V. Tassone

[57] ABSTRACT

The combination of an endless power transmission belt construction and a pulley therefor, the belt construction and methods of making the same are provided, the belt construction having opposed inner and outer surfaces with each surface defining a plurality of longitudinally disposed and alternately spaced apart like projections and grooves that are adapted to mesh with a ribbed surface of a pulley, the depth of the grooves of each of the surfaces of the belt construction being substantially less than the approximately 2.4 mm depth of the grooves of a similar belt construction that is adapted to have one of the opposed surfaces thereof mesh with the ribbed surface of the pulley in the same manner as the first mentioned belt construction.

8 Claims, 4 Drawing Sheets

BELT CONSTRUCTION, THE COMBINATION OF THE BELT CONSTRUCTION AND A PULEY AND METHODS OF MAKING THE SAME

BACKGROUND OF THE INVENTION

1. Field of the Invention

This invention relates to a new endless power transmission belt construction and to a new combination of the belt construction and a rotatable pulley means as well as to new methods of making the same.

2. Prior Art Statement

It is known to provide the combination of an endless power transmission belt construction having opposed side edge means and having opposed inner surface means and outer surface means with each surface means defining a plurality of longitudinally disposed and alternately spaced apart like projections and grooves, the belt construction having a certain thickness between the roots of the grooves in the opposed surface means thereof, and a rotatable pulley means having an outer peripheral ribbed surface means meshing with a portion of one of the inner surface means and the outer surface means of the belt construction and defining a plurality of longitudinally disposed and alternately spaced apart like projections and grooves that respectively have portions thereof for serially meshing respectively with cooperating portions of the grooves and projections of the one surface means of the belt construction, the depth of the grooves of each of the surface means of the belt construction being approximately 2.4 mm or greater. For example, see the U.S. Pat. No. 4,773,895 to Takami et al.

SUMMARY OF THE INVENTION

It is one feature of this invention to provide a new endless power transmission belt construction that has a ribbed inner surface means and a ribbed outer surface means that cooperates with outer ribbed surface means of pulley means in a manner to overcome some of the problems associated with the prior known belt constructions wherein the depth of the grooves of each of the surface means of the belt construction is approximately 2.4 mm or greater.

In particular, it has been found that such prior known double ribbed belt constructions that are being made with the standard rib profile of single ribbed belt constructions have increased thickness which contributes to a significant reduction in flex life if the pulley means utilized therewith have the conventional diameters thereof that are normally used with the single ribbed belt construction.

However, it was found according to the teachings of this invention that the rib height can be reduced on both sides of the belt construction and that the resulting new belt construction can be utilized with pulley means with typical diameters and have an increase in the flex life thereof over the prior known double ribbed belt construction.

For example, one embodiment of this invention provides the combination of an endless power transmission belt construction having opposed side edge means and having opposed inner surface means and outer surface means with each surface means defining a plurality of longitudinally disposed and alternately spaced apart like projections and grooves, the belt construction having a certain thickness between the roots of the grooves in the opposed surface means thereof, and a rotatable pulley means having an outer peripheral ribbed surface means meshing with a portion of one of the inner surface means and the outer surface means of the belt construction and defining a plurality of longitudinally disposed and alternately spaced apart like projections and grooves that respectively have portions thereof for serially meshing respectively with cooperating portions of the grooves and projections of the one surface means of the belt construction, the depth of the grooves of each of the surface means of the belt construction being substantially less than the approximately 2.4 mm depth of the grooves of a similar belt construction that is adapted to have one of the opposed surface means thereof mesh with the ribbed surface means of the pulley means.

Accordingly, it is an object of this invention to provide a new combination of an endless power transmission belt construction and a rotatable pulley means therefor, the combination of this invention having one or more of the novel features of this invention as set forth above or hereinafter shown or described.

Another object of this invention is to provide a new method of making such a combination, the method of this invention having one or more of the novel features of this invention as set forth above or hereinafter shown or described.

Another object of this invention is to provide a new endless power transmission belt construction having one or more of the novel features of this invention as set forth above or hereinafter shown or described.

Another object of this invention is to provide a new method of making such an endless power transmission belt construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
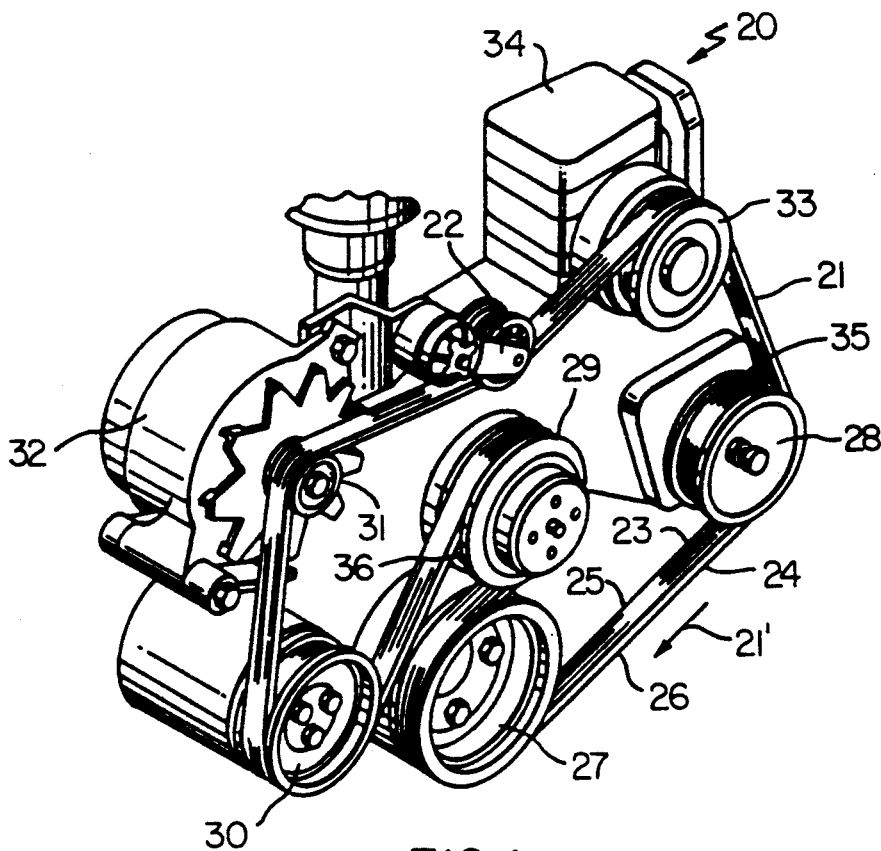
FIG. 1 is a fragmentary isometric view looking toward the front end of an automobile engine which utilizes a prior known belt construction.

While the various features of this invention are hereinafter illustrated and described as being particularly adapted to provide belt constructions for use with pulley means of an internal combustion engine, it is to be understood that the various features of this invention can be utilized singly or in various combinations thereof to provide belt constructions for other types of apparatus as desired.

Therefore, this invention is not to be limited to only the embodiments illustrated in the drawings, because the drawings are merely utilized to illustrate one of the wide variety of uses of this invention.

Figure 2:
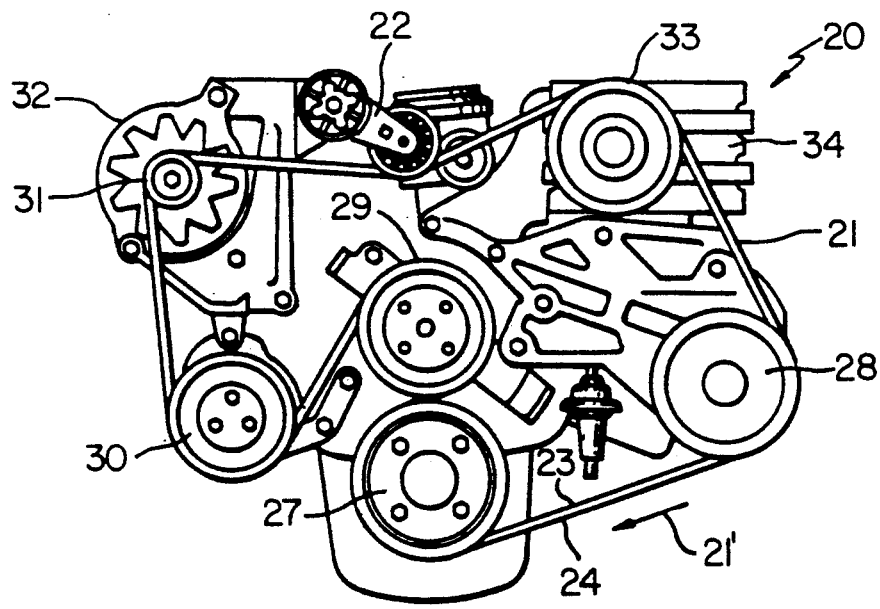
FIG. 2 is a view looking perpendicularly toward the front end of the automobile engine of FIG. 1.

Referring now to FIGS. 1 and 2, an automobile engine is generally indicated by the reference numeral 20 and utilizes an endless power transmission belt construction 21 for driving a plurality of driven accessories as hereinafter set forth. A belt tensioner is indicated by the reference numeral 22 and is utilized to provide a tensioning force on the belt construction 21 in the manner fully set forth in the U.S. Pat. No. 4,596,538, to Henderson, whereby this U.S. patent is being incorporated into this disclosure by this reference thereto.

The endless power transmission belt construction 21 is made primarily of polymeric material and has a polyester load carrying cord in a manner conventional in the art, the belt construction 21 having opposed inner surface means 23 and outer surface means 24 with such surface means 23 and 24 each being ribbed and thereby having a plurality of longitudinally disposed and alternately spaced apart like projections and grooves disposed substantially parallel and intermediate opposed side edges 25 and 26 of the belt construction 21 in a manner well known in the art. For example, see the aforementioned U.S. Pat. No. 4,773,895, to Takami et al, whereby this U.S. patent is also being incorporated into this disclosure by this reference thereto.

The belt construction 21 is driven in the direction 21' by a driving sheave or pulley means 27 which is operatively interconnected to the crank shaft of the engine 20 in a manner well known in the art. The driving sheave 23 drives the belt construction 21 in an endless path and thereby drives a sheave or pulley means 28 of a power steering device used in the automobile (not shown) utilizing the engine 20, a sheave or pulley means 29 of an engine water pump, a sheave or pulley means 30 of an air pump of a type used in an anti-pollution system for the engine 20, a sheave or pulley means 31 of an engine electrical alternator 32 and a sheave or pulley means 33 of a compressor 34 of an air conditioning system for the automobile utilizing the engine 20.

The sheaves or pulley means 27, 28, 30, 31 and 33 respectively have ribbed outer peripheral surface means 35 against which the inner surface means 23 of the belt construction 21 meshes in its driving relation therewith, such ribbed surface means 35 defining a plurality of longitudinally disposed and alternately spaced apart like projections and grooves that respectively have portions thereof for serially meshing respectively with cooperating portions of the grooves and projections of the inner surface means 23 of the belt construction 21 in a manner well known in the art and hereinafter set forth.

However, it can be seen that the outer surface means 24 of the belt construction 21 is disposed against the outer peripheral surface 36 of the sheave or pulley means 29 to cause a driving relation therewith and the outer peripheral surface 36 of the sheave or pulley means 29 can be ribbed in the same manner as the surfaces 35 previously described to cooperate with the ribs on the outer surface means 24 of the belt construction 21 or can remain smooth and still be driven by the ribbed surface means 24 of the belt construction 21 engaging against such smooth surface 36 also in a manner well known in the art to tend to prevent slippage therebetween.

Figure 3:
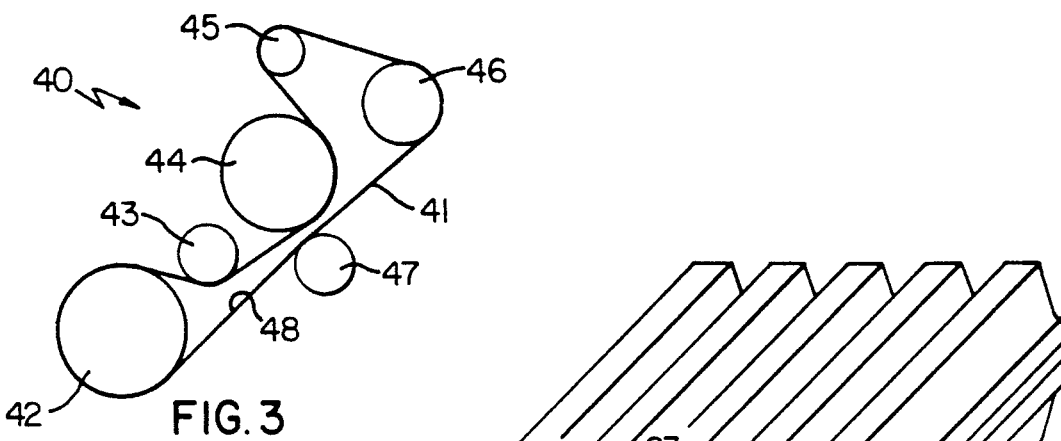
FIG. 3 is a schematic view illustrating the new belt construction of this invention in combination with pulley means arranged in a manner for a particular internal combustion engine.

While FIGS. 1 and 2 represent a prior known arrangement, reference is now made to FIG. 3 wherein one embodiment of the combination of this invention is generally indicated by the reference numeral 40 and comprises a belt construction 41 of this invention looped around or against a crank shaft drive pulley means 42, a tensioner pulley means 43, a power steering pulley means 44, an alternator pulley means 45, an air conditioner pulley means 46 and an idler pulley means 47 whereby it can be seen that the inner surface means 48 of the belt construction 41 is in driven or driving relation with the pulley means 42, 45 and 46 while the outer surface means 49 of the belt construction 41 is in driving relationship with the tensioner pulley means 43, the power steering pulley means 44 and the idler pulley means 47 as illustrated.

Figure 4:
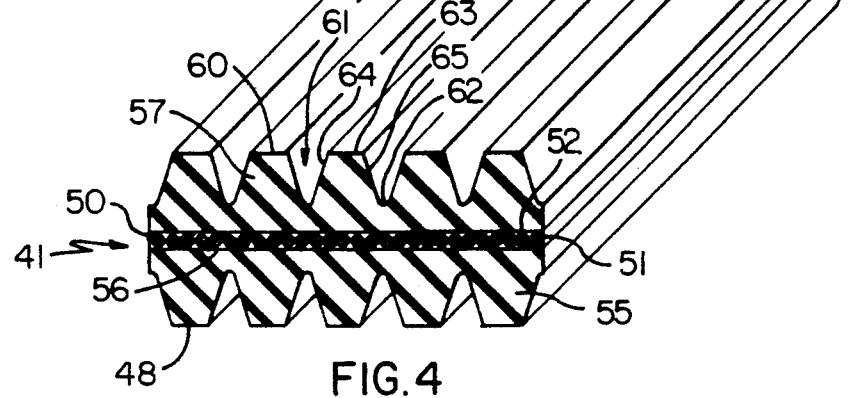
FIG. 4 is a fragmentary perspective view, partially in cross section, illustrating the new belt construction of this invention.
Figure 5:
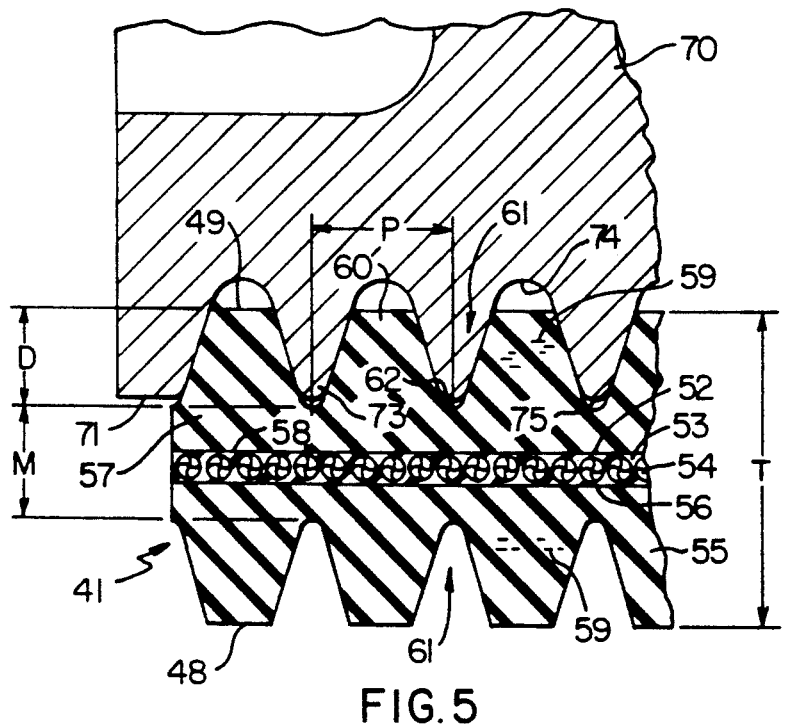
FIG. 5 is an enlarged fragmentary cross-sectional view illustrating the belt construction of FIG. 4 engaging the ribbed surface of a pulley means in the combination of FIG. 3 to produce the new combination of this invention.

As best illustrated in FIGS. 4 and 5, the belt construction 41 of this invention has opposed parallel side edge means 50 and 51 and an intermediate tension section 52 comprising a polymeric cushion 53 and cord means 54 whereby the inner surface means 48 is defined by an outer compression section 55 of the belt construction 41 that is secured to the side 56 of the tension section 52 while the outer surface means 49 of the belt construction 41 is defined by an outer compression section 57 of the belt construction 41 that is secured to the side 58 of the tension section 52.

While the materials forming the belt construction 41 of this invention can comprise any suitable polymeric material, all in the manner well known in the art, it is to be understood that the various layers of the belt construction of this invention can also be provided with reinforcing means therein, such as the fiber means 59 illustrated in FIG. 5 for the inner and outer sections 55 and 57. Such reinforcing means can be disposed in the cushion means 53 of the tension section 52 with or without having the fiber means 59 in the sections 55 and 57 as desired.

In one working embodiment of the belt construction 21 of this invention, the cushion means 53 of the tension section 52 can contain about 5 phr of reinforcing fiber material, such as the well known stifflex material, with the cushion means 53 running circumferentially around the belt construction while the compression sections 55 and 57 are laid transversely thereto as it is very difficult to make the cushion means 52 transversely laid as it has very little strength in the cross direction and would stretch easily during building.

In any event, it can be seen that the sections 55 and 57 have the surfaces 48 and 49 thereof defining a plurality of longitudinally disposed and alternately spaced apart like projections 60 and grooves 61, the grooves 61 each having an arcuate root 62 while each projection 60 has a generally truncated configuration defined by a flat apex surface 63 and a pair of opposed converging side walls 64 and 65 as illustrated.

Thus, it can be seen in FIG. 5 that the belt construction 41 of this invention has a total thickness T with the grooves 61 having a pitch P, and a depth of D. The roots 62 of the grooves 61 in the section 55 are spaced from the roots 62 of the grooves 61 in the section 57 by a distance M.

A pulley means is indicated by the reference numeral 70 in FIG. 5 and can comprise any one of the pulley means 42-47 of the combination 40 illustrated in FIG. 3 and has a ribbed outer peripheral surface means 71 that defines a plurality of longitudinally disposed and alternately spaced apart like projections 73 and grooves 74 that respectively have portions thereof that serially mesh with the grooves 61 and projections 60 of the belt construction 21, the surface means 71 being illustrated in FIG. 5 as meshing with the outer surface means 49 of the belt construction 21 but it is to be understood that the same could mesh with the inner surface means 48 thereof in a like manner.

As previously stated, the pulley means 42-47 of the combination 40 have the projections 73 and grooves 74 thereof formed for normally meshing with belt constructions wherein the depth D of the grooves thereof is approximately 2.4 mm or larger, such as 2.8 mm as disclosed in the aforementioned U.S. Pat. No. 4,773,895 to Takami et al.

However, as previously stated, it was found according to the teachings of this invention that the depth D of the grooves 61 of the belt construction 41 of this invention can be substantially less than the approximately 2.4 mm depth of the prior known belt construction and still function with the projections 73 and grooves 74 of the pulleys 42-48 with an extended life of the belt construction over the life of a similar belt construction that is formed of the same material and has the same middle thickness M but with a groove depth D of 2.4 mm or larger whereby the diameters of the pulley means 42-47 need not be changed even though the belt construction 41 is exposed to considerable flexing as the belt construction 41 moves through the path defined by the pulley means 42-47 as illustrated in FIG. 3.

In particular, it was found that the depth D of the belt construction 41 can be approximately 2.0 mm while the middle thickness M of the belt construction 41 is substantially the same as the middle thickness M of the prior known belt constructions wherein the depth D was 2.4 mm or larger.

For example, in the one working embodiment of the belt construction 41 wherein the depth D is approximately 2.0 mm, the middle thickness M is approximately 2.82 mm while the overall thickness T of the belt construction 41 is approximately 6.82 mm with the pitch P for the grooves 61 being approximately 3.56 mm.

In addition, the roots 62 of the grooves 61 are each provided with a maximum radius of approximately 0.3 mm as the minimum radius on the tip 75 of each projection 73 on the pulley means 70 is approximately 0.3 mm and thereby insures that the roots 62 of the grooves 61 never touch the tips 75 of the projections 73 of the pulley means 70 so as to reduce any tendency of "rib splitting" and to enhance the transverse rigidity of the belt construction 41. This is accomplished by maximizing the radius of the roots 62 of the grooves 61 in order to keep a maximum thickness between the neutral axis cord and the rib root.

Such one working embodiment of the belt construction 41 of this invention is approximately 1702.4 mm in length and approximately 21.34 mm wide with six projections 60 on each surface means 48 and 49 thereof. This particular belt construction 41 is utilized in the combination 40 of FIG. 3 wherein the effective diameters of the pulley means 42, 47, 46, 45, 44 and 43 are respectively and approximately 177.0 mm, 81.5 mm, 110.0 mm, 57.0 mm, 154.2 mm and 81.5 mm.

While certain dimensions have been previously set forth in connection with one working embodiment of this invention, it is to be understood that such dimensions are not to be a limitation on the claimed features of this invention as other suitable dimensions can be used, as desired.

Figure 6:
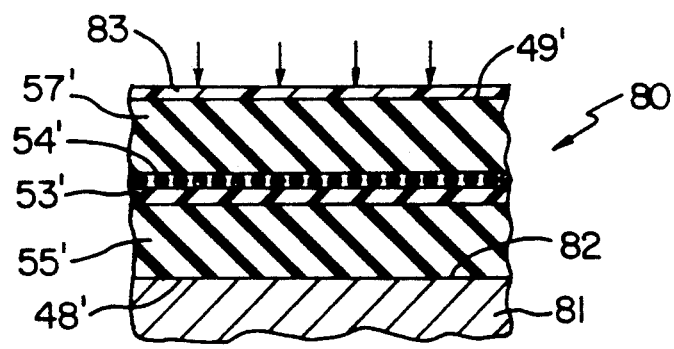
FIG. 6 is a fragmentary cross-sectional view schematically illustrating how the new belt construction of FIG. 4 of this invention is formed on a forming drum means.

The belt construction 41 of this invention can be made by the method and apparatus that is generally indicated by the reference numeral 80 in FIG. 6 wherein a metallic drum 81 is provided and has an outer peripheral surface means 82 against which the inner surface means 48' of an annular section 55' of polymeric material is disposed in a manner well known in the art. Thereafter, a layer of cushion material 53' is disposed against the material 55' and then the cord means 54' is wound onto the cushion material 53' as illustrated in FIG. 6 and in a manner well known in the art. Thereafter, a layer of polymeric material 57' is disposed on top of the cord means 54'. The layers 55', 53', 54' and 57' are then compressed toward the drum 81 by steam and pressure being applied thereto, such as against a flexible membrane 83 disposed about the layer 57' so as to form and cure the resulting belt sleeve in a manner well known in the art of building belt constructions from a plurality of layers that are compressed together onto a building drum.

Thereafter, the belt sleeve is cut into individual belt constructions 41 and the surface means 48' and 49' have the grooves 61 and projections 60 formed therein by cutting, milling or grinding all in a manner well known in the art for providing the ribbed surfaces 48 and 48 as illustrated.

Of course, the layers 55', 53', 54' and 57' could be stacked together against a drum which has the peripheral surface 82 thereof profiled and a means having the surface likewise profiled could be disposed against the surface means 49' or the layer 57' so that the resulting belt sleeve formed on the drum 81 would have ribbed surface means 48 and 49 also in a manner well known in the art.

In any event, it can be seen that by first disposing the cushion material 53' in place and then winding the cord means 54' on top of the same, in effect, the cushion material 53' is disposed on only one side of the cord means 54' but that the cord means 54' is subsequently moved into the cushion material 53' in the manner illustrated in FIGS. 4 and 5 during the forming of the belt construction 41.

While the belt construction 41 of this invention has been previously described as having the projections 60 and grooves 61 being substantially identical on both sides 48 and 49 of the belt construction 41, it is to be understood that the same could be dissimilar and still each have a depth D that is substantially less than the aforementioned 2.4 mm of the prior known belt construction.

Figure 7:
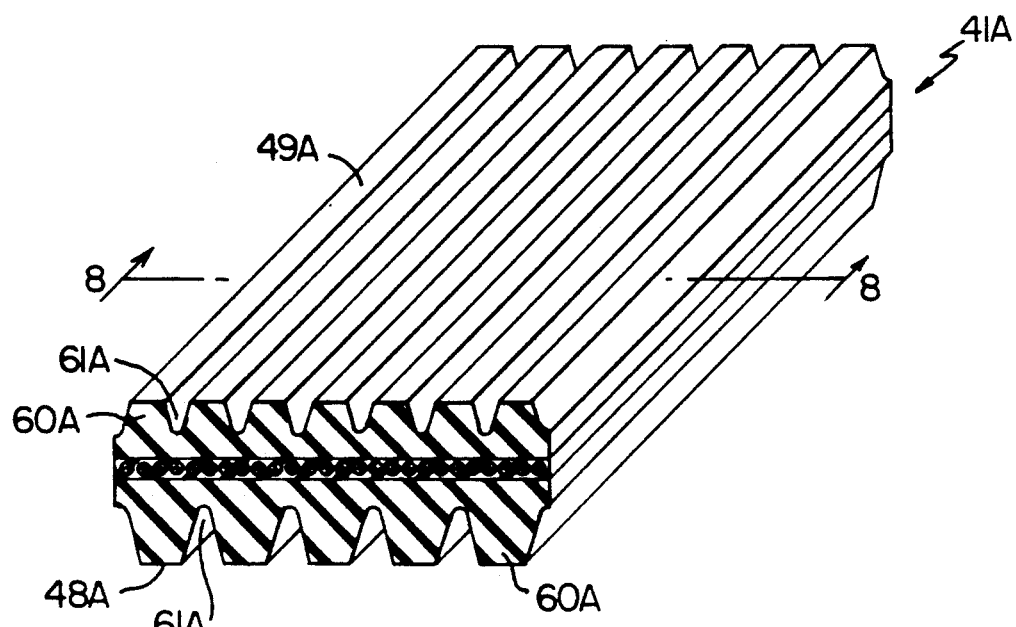
FIG. 7 is a view similar to FIG. 4 and illustrates another new belt construction of this invention.
Figure 8:
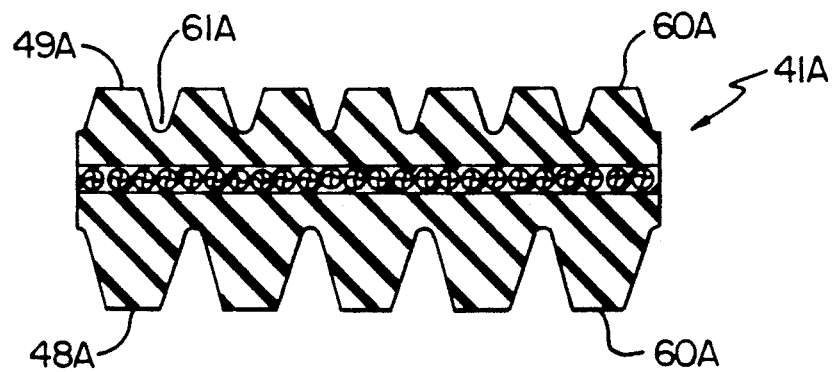
FIG. 8 is an enlarged fragmentary cross-sectional view taken on line 8—8 of FIG. 7.

In particular, reference is now made to FIGS. 7 and 8 wherein another belt construction of this invention is generally indicated by the reference numeral 41A and parts thereof similar to the belt construction 41 previously described are indicated by like reference numerals followed by the reference letter "A".

As illustrated in FIGS. 7 and 8, the surface means 49A of the belt construction 41A has the grooves 61A thereof with a depth D smaller than the depth D of the grooves 61A in the surface means 48A thereof whereby the depths D of the grooves 61A in the surface means 48A could be the aforementioned 2.0 mm while the depths D of the grooves 61A in the surface means 49A would be less than 2.0 mm. Also, it can be seen in FIGS. 7 and 8 that the number of projections 60 that form the surface means 49A is greater than the number of projections 60A that form the surface means 48A.

It is also to be understood that in order to increase the flexibility of the belt constructions of this invention, the same could be cogged on one or both opposed surface means thereof if desired.

Figure 9:
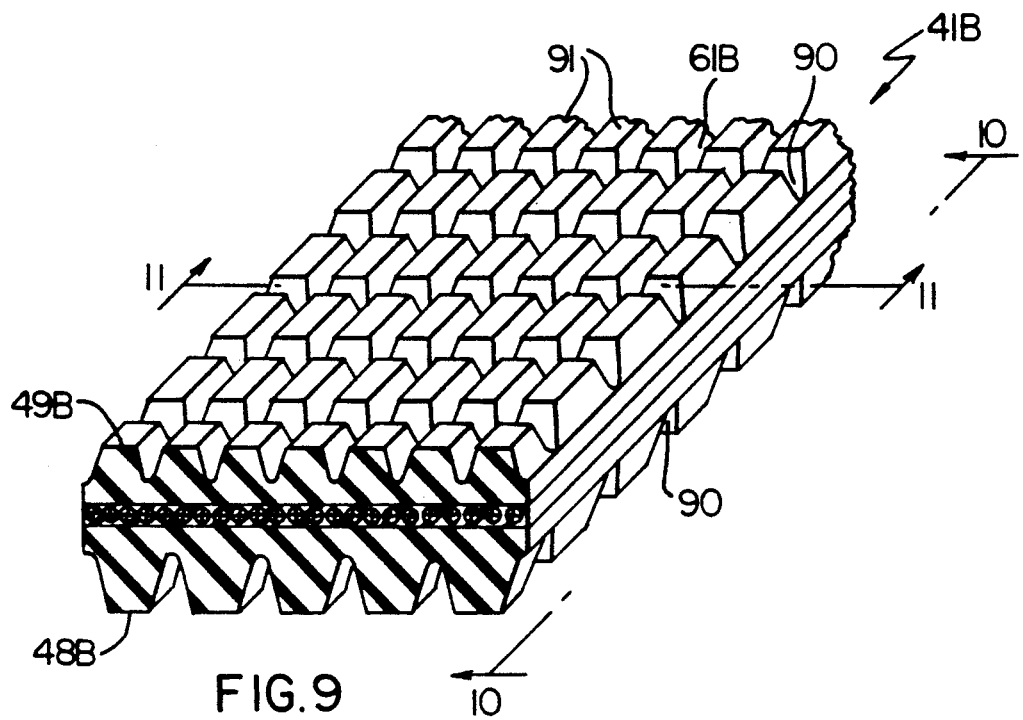
FIG. 9 is a view similar to FIG. 4 and illustrates another new belt of this invention.
Figure 10:
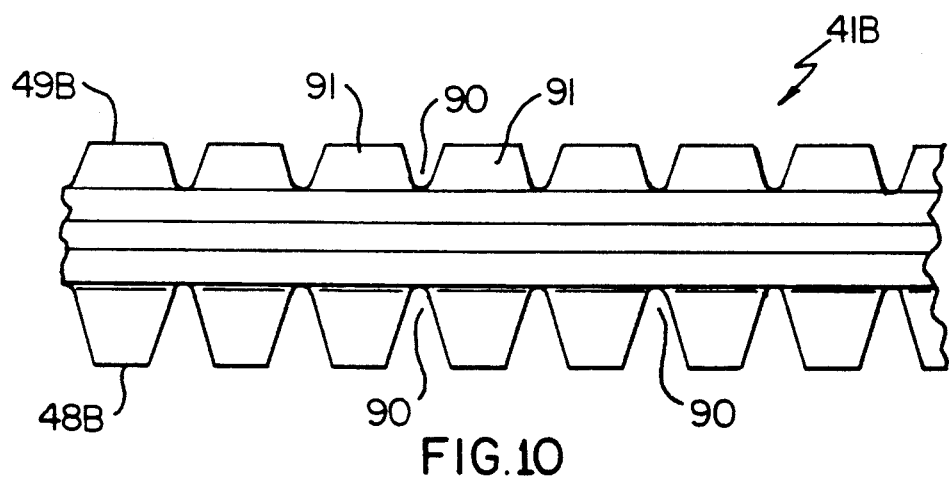
FIG. 10 is an enlarged fragmentary side view of the belt construction of FIG. 9 and is taken in the direction of the arrows 10—10 of FIG. 9.
Figure 11:
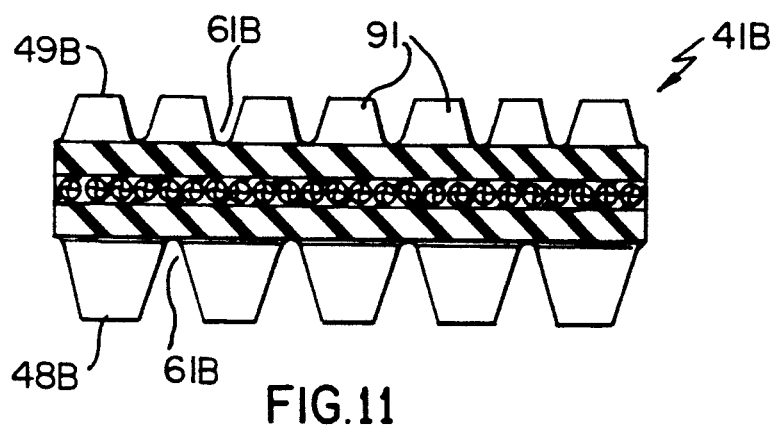
FIG. 11 is an enlarged fragmentary cross-sectional view taken on 11—11 of FIG. 9.

For example, reference is now made to FIGS. 9-11 wherein another belt construction of this invention is generally indicated by the reference numeral 41B and parts thereof similar to the belt constructions 41 and 41A previously described are indicated by like reference numerals followed by the reference letter "B".

As illustrated in FIGS. 9 and 11, the belt construction 41B is substantially identical to the belt construction 41A previously described except that the surface means 49B thereof is provided with a plurality of parallel spaced apart grooves 90 that extend substantially perpendicular to the longitudinal axis of the belt construction 41B so as to provide individual cogs 91 in relation to the longitudinal grooves 61B. Similarly, the surface means 48B is provided with a plurality of grooves 90 that are disposed transverse to the longitudinal axis of the belt construction 41B so as to form the cogs 91.

If desired, the grooves 90 in the surface means 49B can be the same depth as the grooves 61B in the surface means 49B and the depth of the grooves 90 in the surface means 48B can be the same depth as the depth of the grooves 61B in the surface means 48B as illustrated. However, it is to be understood that the depth of the cogging grooves 90 as well as the spacing therebetween could be different, irregular, etc. rather than uniform as illustrated. For example, the depths of the grooves 90 and the spacing thereof could be similar to any of the arrangements as is provided in the U.S. Pat. No. 4,938,736, patent to Miranti, Jr., whereby this patent is being incorporated into this disclosure by this reference thereto.

In any event, it can be seen that in each of the belt constructions 41, 41A and 41B of this invention, the depth D of the grooves in both of the opposed surfaces thereof are each substantially less than the approximately 2.4 mm depth of the grooves of the prior known belt constructions and it may be that the depths of the grooves of the belt constructions of this invention can be identical or can be different as desired.

In addition, one or both opposed surface means of the belt construction of this invention can be cogged in a uniform or non-uniform manner as desired.

Thus, it can be seen that this invention not only provides a new combination of a belt construction and pulley means therefor, but also this invention provides a new belt construction and a new method of making the same.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In the combination of an endless power transmission belt construction having opposed side edge means and having opposed inner surface means and outer surfaces means with each said surface means defining a plurality of longitudinally disposed and alternately spaced apart like projections and grooves, said belt construction having a certain thickness between the roots of said grooves in said opposed surface means thereof, and a rotatable pulley means having an outer peripheral ribbed surface means meshing with a portion of one of said inner surface means and said outer surface means of said belt construction and defining a plurality of longitudinally disposed and alternately spaced apart like projections and grooves that respectively have portions thereof for serially meshing respectively with cooperating portions of said grooves and projections of said one surface means of said belt construction, the improvement wherein the depth of said grooves of each said surface means of said belt construction is substantially less than the approximately 2.4 mm depth of the grooves of a similar belt construction that is adapted to have one of the opposed surface means thereof mesh with said ribbed surface means of said pulley means, the depth of said grooves in said inner surface means of said belt construction being substantially the same as the depth of said grooves in said outer surface means of said belt construction, said depth of said grooves of said belt construction being approximately 2.0 mm, said certain thickness of said belt construction being approximately 2.82 mm and the entire thickness of said belt construction being approximately 6.82 mm.

2. A combination as set forth in claim 1 wherein the pitch of said grooves in said inner surface means of said belt construction is substantially the same as the pitch of said grooves in said outer surface means of said belt construction.

3. A combination as set forth in claim 2 wherein said pitch of said grooves of said belt construction is approximately 3.56 mm.

4. A combination as set forth in claim 1 wherein said belt construction has a tension section comprising a cushion section and cord means, said cushion section being initially disposed on only one side of said cord means with said cord means thereafter being embedded therein.

5. In an endless power transmission belt construction having opposed side edge means and having opposed inner surface means and outer surface means with each said surface means defining a plurality of longitudinally disposed and alternately spaced apart like projections and grooves, said belt construction having a certain thickness between the roots of said grooves in said opposed surface means thereof, said belt construction being adapted to have one of said inner surface means and said outer surface means thereof mesh with a ribbed outer peripheral surface means of a rotatable pulley means that has said ribbed surface means defining a plurality of longitudnally disposed and alternately spaced apart like projections and grooves that respectively have portions thereof for serially meshing respectively with cooperating portions of said grooves and projections of said one surface means of said belt construction, the improvement wherein the depth of said grooves of each said surface means of said belt construction is substantially less than the approximately 2.4 mm depth of the grooves of a similar belt construction that is adapted to have one of the opposed surface means thereof mesh with said ribbed surface means of said pulley means, the depth of said grooves in said inner surface means of said belt construction being substantially the same as the depth of said grooves in said outer surface means of said belt construction, said depth of said grooves of said belt construction being approximately 2.0 mm, said certain thickness of said belt construction being approximately 2.82 mm and the entire thickness of said belt construction being approximately 6.82 mm.

6. A belt construction as set forth in claim 5 wherein the pitch of said grooves in said inner surface means of said belt construction is substantially the same as the pitch of said grooves in said outer surface means of said belt construction.

7. A belt construction as set forth in claim 6 wherein said pitch of said grooves of said belt construction is approximately 3.56 mm.

8. A belt construction as set forth in claim 5 wherein said belt construction has a tension section comprising a cushion section and cord means, said cushion section being initially disposed on only one side of said cord means with said cord means thereafter being embedded therein.

* * * * *